Patented Sept. 27, 1932

1,879,003

UNITED STATES PATENT OFFICE

GORDON A. ALLES, OF MONTEREY PARK, CALIFORNIA

SALTS OF 1-PHENYL-2-AMINOPROPANE

No Drawing. Application filed September 2, 1930. Serial No. 479,427.

This invention relates to a new composition of matter useful for therapeutic purposes.

The composition of matter of my present invention consists of a salt of 1-phenyl-2-aminopropane, $C_6H_5\text{-}CH_2\text{-}CH(CH_3)NH_2$, with an acid. Various acids may be used, the most useful being hydrochloric or sulphuric. The salts of this 1-phenyl-2-aminopropane are physiologically active and produce effects in animals and man similar to the effect of the salts of ephedrine and may be readily purified by crystallization and serve as effective agents for the administration of this amine. The method of making such salts preferably comprises synthesizing the 1-phenyl-2-aminopropane, and then converting the 1-phenyl-2-aminopropane to a salt thereof, and the last mentioned conversion may be used for the purification or isolation of the 1-phenyl-2-aminopropane, and the formation of a salt thereof, regardless of whether the 1-phenyl-2-aminopropane is prepared by the method of synthesis herein described or by any other method.

The preferred method of synthesizing the 1-phenyl-2-aminopropane,

is by the reduction of the phenyl-nitropropylene, $C_6H_5\text{-}CH=C(CH_3)NO_2$. This reduction may be carried out by sodium-mercury amalgam in an ethanol-acetic acid solution or by electrolytic reduction at a metal cathode in a suitable solution. This cathodic reduction can be carried out with good yield in the following manner:

One mol of the phenyl-nitropropylene, $$C_6H_5.CH=C(CH_3)NO_2,$$

is dissolved with a solvent prepared by mixing one liter of ethanol with one-half liter of acetic acid and one-half liter of twelve normal sulphuric acid. The resultant solution is placed in the cathode compartment of a divided electrolytic cell containing a metallic cathode of mercury, copper, or other metal of similar nature. Current is passed, using a current density of about two-tenths ampere per square centimeter of cathode surface.

The temperature is kept about 40° C. during the electrolysis which is continued until at least eight Faradays of electricity have been passed.

When the reduction is completed, the 1-phenyl-2-aminopropane may be separated from the solution. A convenient way of doing this is by removing the ethanol and ethyl acetate present by evaporation and then making the residual solution strongly alkaline by addition of caustic alkali. The basic layer thus formed is separated from the aqueous solution and contains the desired 1-phenyl-2-aminopropane.

Such a product, however, as thus obtained, is in a crude or somewhat impure state, being contaminated by the presence of small amounts of other materials, such as side products of the reduction reaction. This condition is true, moreover, regardless of the particular method of synthesis employed, and it is therefore necessary in any case, when it is desired to obtain the product in suitable form for therapeutic administration, to further isolate or purify the compound, and it will be understood that the hereinafter described method of isolation is of general application for this purpose, as applied to any 1-phenyl-2-aminopropane product, regardless of the method by which the product may have been synthesized.

According to my invention the isolation or purification of the 1-phenyl-2-aminopropane is effected by exactly neutralizing the impure product with an acid, such as hydrochloric or sulphuric acid, in aqueous solution followed by crystallization from water, alcohol, acetone or suitable solution. The 1-phenyl-2-aminopropane is thus converted into a salt of the acid used. For example, if hydrochloric acid is used, it is converted into its hydrochloride,

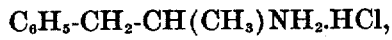

which readily crystallizes from alcohol or acetone without solvent of crystallization, or if sulphuric acid is used it is converted into its neutral sulphate,

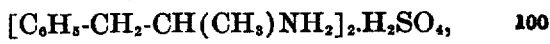

which readily crystallizes from water or alcohol without solvent of crystallization.

The hydrochloride and neutral sulphate of 1-phenyl-2-aminopropane give analyses corresponding to the following formulae and have melting points as listed: 1-phenyl-2-aminopropane hydrochloride $C_6H_5\text{-}CH_2\text{-}CH(CH_3)NH_2.HCl$ M.144-5° C.

1-phenyl-2-aminopropane sulphate $[C_6H_5\text{-}CH_2\text{-}CH(CH_3)NH_2]_2.H_2SO_4$
M. above 285° C.

The recrystallized and purified material may be dissolved in water, alcohol or other suitable solvent for the purpose of therapeutic administration.

It will be seen, therefore, that the conversion of 1-phenyl-2-aminopropane to a salt thereof not only offers a simple and convenient method of purification or isolation thereof from the impurities with which the product obtained by synthesis is ordinarily contaminated, but also provides a highly advantageous means of therapeutic use thereof.

The above described method of synthesis of 1-phenyl-2-aminopropane is believed to be a new and useful method of preparation of such an amine, independent of the subsequent conversion thereof into a salt, and said method is claimed in a separate application Ser. No. 479,428, filed by me of even date herewith.

I claim:

1. As a new composition of matter, a salt of 1-phenyl-2-aminopropane.

2. As a new composition of matter, the hydrochloride of 1-phenyl-2-aminopropane.

In testimony whereof I have hereunto subscribed my name this 29th day of August, 1930.

GORDON A. ALLES.

DISCLAIMER 1,879,003.—*Gordon A. Alles*, Monterey Park, Calif. SALTS OF 1-PHENYL-2-AMINO-PROPANE. Patent dated September 27, 1932. Disclaimer filed August 29, 1934, by the patentee.

Hereby enters this dislaimer to that part of the claims in said specification of said patent which is as follows, to wit:

He disclaims so much of claim 1 of said patent as is in excess of the following:

"As a physiologically active therapeutic agent capable of producing effects in animals and man similar to the effect of salts of ephedrine, a salt of 1-phenyl-2-aminopropane."

He disclaims so much of claim 2 of said patent as is in excess of the following:

"As a physiologically active therapeutic agent capable of producing effects in animals and man similar to the effect of salts of ephedrine, the hydrochloride of 1-phenyl-2-aminopropane."

[*Official Gazette September 18, 1934.*]

which readily crystallizes from water or alcohol without solvent of crystallization.

The hydrochloride and neutral sulphate of 1-phenyl-2-aminopropane give analyses corresponding to the following formulæ and have melting points as listed: 1-phenyl-2-aminopropane hydrochloride $C_6H_5\text{-}CH_2\text{-}CH(CH_3)NH_2.HCl$ M.144-5° C.

1-phenyl-2-aminopropane sulphate $[C_6H_5\text{-}CH_2\text{-}CH(CH_3)NH_2]_2.H_2SO_4$
M. above 285° C.

The recrystallized and purified material may be dissolved in water, alcohol or other suitable solvent for the purpose of therapeutic administration.

It will be seen, therefore, that the conversion of 1-phenyl-2-aminopropane to a salt thereof not only offers a simple and convenient method of purification or isolation thereof from the impurities with which the product obtained by synthesis is ordinarily contaminated, but also provides a highly advantageous means of therapeutic use thereof.

The above described method of synthesis of 1-phenyl-2-aminopropane is believed to be a new and useful method of preparation of such an amine, independent of the subsequent conversion thereof into a salt, and said method is claimed in a separate application Ser. No. 479,428, filed by me of even date herewith.

I claim:

1. As a new composition of matter, a salt of 1-phenyl-2-aminopropane.

2. As a new composition of matter, the hydrochloride of 1-phenyl-2-aminopropane.

In testimony whereof I have hereunto subscribed my name this 29th day of August, 1930.

GORDON A. ALLES.

DISCLAIMER 1,879,003.—*Gordon A. Alles*, Monterey Park, Calif. SALTS OF 1-PHENYL-2-AMINO-PROPANE. Patent dated September 27, 1932. Disclaimer filed August 29, 1934, by the patentee.

Hereby enters this dislaimer to that part of the claims in said specification of said patent which is as follows, to wit:

He disclaims so much of claim 1 of said patent as is in excess of the following:

"As a physiologically active therapeutic agent capable of producing effects in animals and man similar to the effect of salts of ephedrine, a salt of 1-phenyl-2-aminopropane."

He disclaims so much of claim 2 of said patent as is in excess of the following:

"As a physiologically active therapeutic agent capable of producing effects in animals and man similar to the effect of salts of ephedrine, the hydrochloride of 1-phenyl-2-aminopropane."

[*Official Gazette September 18, 1934.*]

DISCLAIMER 1,879,003.—*Gordon A. Alles*, Monterey Park, Calif. SALTS OF 1-PHENYL-2-AMINO-PROPANE. Patent dated September 27, 1932. Disclaimer filed August 29, 1934, by the patentee.

Hereby enters this dislaimer to that part of the claims in said specification of said patent which is as follows, to wit:

He disclaims so much of claim 1 of said patent as is in excess of the following:

"As a physiologically active therapeutic agent capable of producing effects in animals and man similar to the effect of salts of ephedrine, a salt of 1-phenyl-2-aminopropane."

He disclaims so much of claim 2 of said patent as is in excess of the following:

"As a physiologically active therapeutic agent capable of producing effects in animals and man similar to the effect of salts of ephedrine, the hydrochloride of 1-phenyl-2-aminopropane."

[*Official Gazette September 18, 1934.*]